US012559190B2

(12) United States Patent
Akami et al.

(10) Patent No.: US 12,559,190 B2
(45) Date of Patent: Feb. 24, 2026

(54) VEHICLE PERIPHERY DETECTION SYSTEM

(71) Applicant: HONDA MOTOR CO., LTD., Tokyo (JP)

(72) Inventors: Kazuki Akami, Tokyo (JP); Hiroshi Maeda, Tokyo (JP); Yoshiyuki Kuroba, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 322 days.

(21) Appl. No.: 18/572,050

(22) PCT Filed: Mar. 16, 2022

(86) PCT No.: PCT/JP2022/011834
§ 371 (c)(1),
(2) Date: Dec. 19, 2023

(87) PCT Pub. No.: WO2023/276318
PCT Pub. Date: Jan. 5, 2023

(65) Prior Publication Data
US 2024/0375740 A1 Nov. 14, 2024

(30) Foreign Application Priority Data
Jun. 28, 2021 (JP) ................................. 2021-107013

(51) Int. Cl.
*B62J 50/22* (2020.01)
*B62J 29/00* (2006.01)
*B62J 45/412* (2020.01)
(52) U.S. Cl.
CPC ............. *B62J 45/412* (2020.02); *B62J 29/00* (2013.01); *B62J 50/22* (2020.02)

(58) Field of Classification Search
CPC ....................................................... B62J 50/22
See application file for complete search history.

(56) References Cited

U.S. PATENT DOCUMENTS 7,837,339 B2 * 11/2010 Sakamoto ................ B62J 29/00
359/842
2012/0200427 A1 8/2012 Kamata
(Continued)

FOREIGN PATENT DOCUMENTS

EP 4056425 A1 9/2022
JP H7-32913 A 2/1995
(Continued)

OTHER PUBLICATIONS

International Search Report corresponding to International Application No. PCT/JP2022/011834, dated May 17, 2022, 2 pages.
(Continued)

*Primary Examiner* — Eric S. McCall
(74) *Attorney, Agent, or Firm* — Rankin, Hill & Clark LLP

(57) ABSTRACT

A vehicle that reduces troublesomeness and appropriately notify vehicle peripheral information. The vehicle includes a vehicle periphery detection sensor that detects a periphery environment of the vehicle; a speed sensor that detects a speed of the vehicle; and a plurality of vehicle periphery information display regions that display vehicle periphery information detected by the vehicle periphery detection sensor, and the vehicle periphery information display regions to be displayed are changed in accordance with the speed detected by the speed sensor.

10 Claims, 6 Drawing Sheets

(56) References Cited

U.S. PATENT DOCUMENTS

| 2021/0001944 A1* | 1/2021 | Katagiri | .................. G01S 7/521 |
| 2021/0053639 A1 | 2/2021 | Kawai et al. | |
| 2022/0165160 A1* | 5/2022 | Maeda | .................. B60W 50/14 |
| 2024/0208416 A1* | 6/2024 | Ichikawa | .................. B60R 1/04 |
| 2025/0052896 A1* | 2/2025 | Ferraro | ................. G01S 13/931 |

FOREIGN PATENT DOCUMENTS

| JP | 2012-164237 A | 8/2012 |
| JP | 2013-208996 A | 10/2013 |
| JP | 2016-043773 A | 4/2016 |
| JP | 6717009 B2 | 7/2020 |
| WO | 2019/171792 A1 | 9/2019 |
| WO | 2021/111734 A1 | 6/2021 |

OTHER PUBLICATIONS

International Preliminary Report on Patentability corresponding to International Application No. PCT/JP2022/011834, dated Sep. 28, 2023, 16 pages.
Japanese Office Action dated Jun. 4, 2024 issued in corresponding Japanese application No. 2023-531421 A; English abstract included (7 pages).
English translation of the International Preliminary Report on Patentability, International Application No. PCT/JP2022/011834, 7 pages.

* cited by examiner

VEHICLE PERIPHERY DETECTION SYSTEM

TECHNICAL FIELD

The present invention relates to a vehicle.

BACKGROUND ART

In related art, a vehicle has been known which includes information display means displaying state information of the vehicle, periphery information of the vehicle, and so forth (for example, see Patent Literatures 1 and 2).

Patent Literature 1 discloses a technique for mounting, on a front fender mirror or a side mirror, information display means for displaying vehicle information useful for travel of a vehicle such as a speed and fuel of the vehicle and a situation of a control system.

Patent Literature 2 discloses a technique which includes a pair of left and right image-capturing devices for respectively imaging left and right rear side areas of a vehicle and a pair of display apparatuses arranged in front of a driver seat to respectively display videos taken by the pair of image-capturing devices, and which moves the pair of display apparatuses to vehicle front relative to reference positions such that an interval between the pair of display apparatuses becomes narrower as a traveling speed of the vehicle rises.

CITATION LIST

Patent Literature

[Patent Literature 1]
 Japanese Patent Laid-Open No. 7-32913
Patent Literature 2
 Japanese Patent No. 6717009

SUMMARY OF INVENTION

Technical Problem

However, because a mirror of a vehicle is a member for enabling a driver to visually recognize a range which cannot actually be seen by a driver, when vehicle information is always together displayed on the mirror as disclosed in Patent Literature 1, excessive notifications are given to the driver and are likely to cause troublesomeness.

Meanwhile, it is possible that as disclosed in Patent literature 2, display apparatuses are moved for being recognized by the driver in order to notify vehicle information as needed, but it is difficult to apply a technique for moving the display apparatuses themselves to a vehicle, in which moving places of the display apparatuses are limited, such as a motorbike, for example.

The present invention has been made in consideration of the above-described circumstances, and an object thereof is to provide a vehicle which can reduce troublesomeness and appropriately notify vehicle peripheral information.

Solution to Problem

The present specification incorporates the entirety of the contents of Japanese Patent Application No. 2021-107013 filed on Jun. 28, 2021.

A vehicle includes: a vehicle periphery detection sensor which detects a periphery environment of the vehicle; a speed sensor which detects a speed of the vehicle; and a plurality of vehicle periphery information display regions which display vehicle periphery information, the vehicle periphery information being detected by the vehicle periphery detection sensor, and the vehicle periphery information display regions to be displayed are changed in accordance with the speed detected by the speed sensor.

Advantageous Effects of Invention

Troublesomeness can be reduced, and vehicle peripheral information can appropriately be notified.

DESCRIPTION OF EMBODIMENTS

Figure 1:
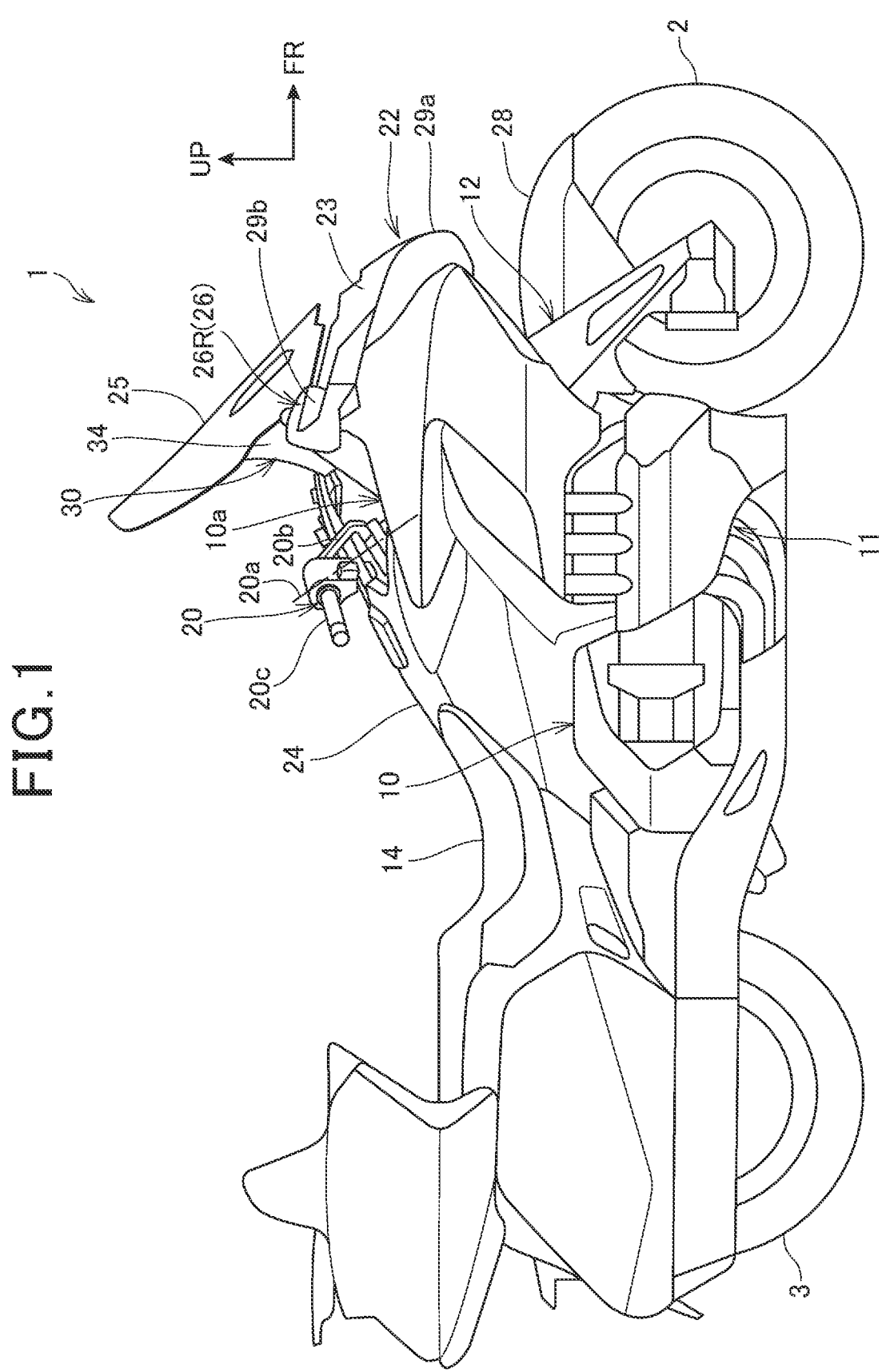
FIG. 1 is a right side view of a motorcycle according to an embodiment of the present invention.

Embodiments of the present invention will hereinafter be described with reference to drawings. Note that in the description, as for descriptions about directions such as front, rear, left, right, up, and down, those directions are the same as directions for a vehicle body unless otherwise mentioned. Further, a reference character FR indicated in each of the drawings denotes front of a vehicle body, a reference character UP denotes an upper area of the vehicle body, and a reference character LH denotes a left area of the vehicle body.

FIG. 1 is a right side view of a motorcycle 1 according to an embodiment of the present invention.

The motorcycle 1 is a vehicle in which an engine 11 as a power unit is supported by a vehicle body frame 10, a steering system 12 which supports a front wheel 2 in a steerable manner is supported by a front end portion of the vehicle body frame 10 so as to be steerable to left and right, a swing arm (not illustrated) which supports a rear wheel 3 is provided to a rear portion of the vehicle body frame 10. The rear wheel 3 is a driving wheel which is driven by the engine 11.

The motorcycle 1 is a straddle type vehicle on which a driver (occupant) straddles a seat 14 to be seated, and the seat 14 is provided above the rear portion of the vehicle body frame 10. Note that the above power unit may be an electric motor.

The seat 14 is supported by the vehicle body frame 10 form a lower area and is arranged between the front wheel 2 and the rear wheel 3 in a vehicle front-rear direction. The seat 14 is arranged in a rear upper area of the engine 11.

The front wheel 2 is supported by a lower end portion of the steering system 12. Handlebars 20 for steering is provided to an upper end portion of the steering system 12. The handlebars 20 are arranged in front of and above the seat 14. The handlebars 20 are supported by a vehicle body front portion 10a which is positioned in front of the seat 14 in the vehicle body and is steered to left and right relative to the vehicle body front portion 10a.

The handlebars 20 rotationally moves around a steering shaft 20a arranged in the vehicle body front portion 10a as a rotation center. The steering shaft 20a is positioned at a center of a vehicle width of the motorcycle 1, similarly to the front wheel 2. The steering shaft 20a is a part of the steering system 12 and is inclined rearward relative to a perpendicular direction in a vehicle side view.

The handlebars 20 include rod-shaped handle portions 20b which respectively extend to left and right outer sides relative to the steering shaft 20a at a vehicle width center and a pair of left and right grip portions 20c which are provided to end portions of the handle portions 20b on vehicle-width-direction outer sides. The driver seated on the seat 14 grasps the left and right grip portions 20c respectively by left and right hands and steers the handlebars 20.

The motorcycle 1 includes a vehicle body cover 22 which covers the vehicle body frame 10 and so forth. The motorcycle 1 includes, in a front portion of the vehicle body cover 22, a front cover 23 which covers, from a front area and side areas, an upper portion of the steering system 12 and the front end portion of the vehicle body frame 10 and a center cover 24 which covers, from an upper area and side areas, the vehicle body between the handlebars 20 and the seat 14. The vehicle front portion 10a is configured with the vehicle body frame 10, the vehicle body cover 22, and so forth.

The motorcycle 1 includes, in front of the handlebars 20, a wind screen 25 which extends upward relative to the front cover 23.

The motorcycle 1 includes a pair of left and right rear-view mirrors 26 which extend from left and right side portions of the front cover 23 to the vehicle-width-direction outer sides. The left and right rear-view mirrors 26 are arranged on the vehicle-width-direction outer sides relative to the wind screen 25. The rear-view mirror 26 is positioned in the vicinity of a lower end portion of the wind screen 25.

Further, the motorcycle 1 includes a front fender 28 which covers the front wheel 2 from an upper area. The front fender 28 is supported by a lower portion of the steering system 12.

The motorcycle 1 includes a headlight 29a and a pair of left and right blinkers 29b as lighting apparatuses. The headlight 29a is provided to a front end portion of the front cover 23, and the blinkers 29b are respectively provided to front surfaces of the left and right rear-view mirrors 26.

Figure 2:
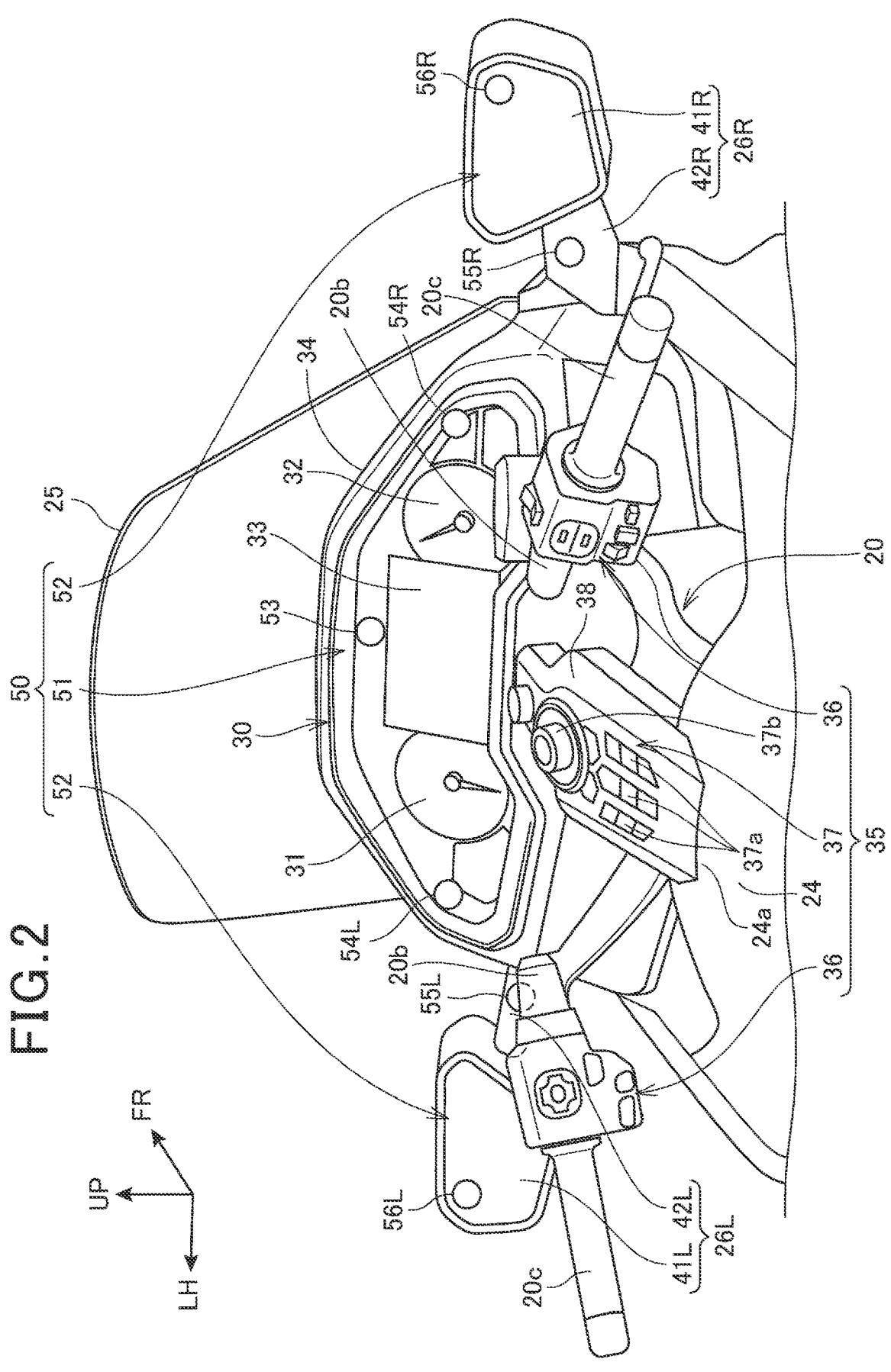
FIG. 2 is a perspective view of a front portion of the motorcycle as seen from right rear.

FIG. 2 is a perspective view of a front portion of the motorcycle 1 as seen from right rear.

In the descriptions about FIG. 2 and subsequent drawings, as for a configuration with a pair of left and right components, distinction may be made by giving "L" to a reference character on the left side and "R" to a reference character on the right side, and only the characters without the "L" or "R" may be indicated.

The motorcycle 1 includes, in the rear of the wind screen 25, a display device 30 which displays information about a state of the motorcycle 1. The display device 30 is arranged in front of and above the handlebars 20. The display device 30 is a meter unit which displays the state of the motorcycle 1 such as a vehicle speed of the motorcycle 1.

The display device 30 includes gauges 31 and 32 which display information about the state of the motorcycle 1 (the vehicle speed and an engine speed) and a monitor 33 which displays various kinds of information. The monitor 33 includes a known display panel such as a liquid crystal panel and displays various kinds of information which includes information about the motorcycle 1 toward the driver side in a rear upper area.

The display device 30 of the present embodiment has a longitudinal shape which is long in a vehicle width direction. When seen from the driver, the display device 30 has a larger size in a left-right direction than a size in an up-down direction (front-rear direction). The monitor 33 is provided to a central portion of the display device 30 in the vehicle width direction, and the gauges 31 and 32 are respectively provided to both of left and right sides of the monitor 33. The display device 30 is surrounded by a meter visor 34.

The motorcycle 1 includes, as operation units 35 for the driver to operate each unit of the motorcycle 1, a pair of handle-side operation units 26 which are respectively provided to the left and right handle portions 20b and a central operation unit 37 which is arranged at a center in the vehicle width in the rear of the display device 30. The operation units 35 are arranged in front of the seat 14.

By operations of the operation units 35, for example, operations of the lighting apparatuses such as the headlight 29a and the blinkers 29b, an operation of an audio system installed in the motorcycle 1, an operation of a navigation system installed in the motorcycle 1, operations about driving modes of the engine 11, operations about characteristic changes of electronic control suspensions of the front wheel 2 and the rear wheel 3, operations about various kinds of operation menus which are displayed on the monitor 33, and so forth are performed.

The motorcycle 1 includes a plate-shaped operation-unit support portion 38 which extends forward from a front end portion 24a of a central portion in the center cover 24 in the vehicle width direction. The operation-unit support portion 38 extends forward from the center cover 24 and through a portion above the handlebars 20 and is connected with a rear end portion of the display device 30. The operation-unit support portion 38 is positioned above a central portion of the handlebars 20 in the vehicle width direction and covers the steering shaft 20a from an upper area. The operation-unit support portion 38 configures a part of the vehicle body cover 22.

The central operation unit 37 is provided on the operation-unit support portion 38 and is positioned between the center cover 24 and the display device 30.

The central operation unit 37 includes pressing operation units 37a which are formed with a plurality of operation buttons and a stick-shaped operation element 37b which protrudes upward from the operation-unit support portion 38.

The operation element 37b is arranged in front of the pressing operation units 37a and protrudes to an area above the pressing operation units 37a. The operation element 37b is positioned at a center in the vehicle width direction. Each unit of the motorcycle 1 can be operated by an inclining operation for inclining the operation element 37b in an arbitrary direction and by a rotation operation for rotating the operation element 37b around a shaft (an axis) of the operation element 37b as a center.

Rear-view mirrors (mirror bodies) 26L and 26R are positioned on both of left and right sides of the display device 30. The rear-view mirrors 26L and 26R include mirror main bodies (mirrors) 41L and 41R which respectively reflect left and right rear areas and support stays (connection portions) 42L and 42R which connect the mirror main bodies 41L and 41R with the motorcycle 1. The support stays 42L and 42R are provided to left and right outer side portions of the meter visor 34. That is, the rear-view mirrors 26L and 26R are provided while abutting the display device 30. When seen from the driver, specifically, the rear-view mirrors 26L and 26R extend on an extended line in a longitudinal direction of the display device 30 in a view in a normal direction of a display screen of the monitor 33.

Figure 3:
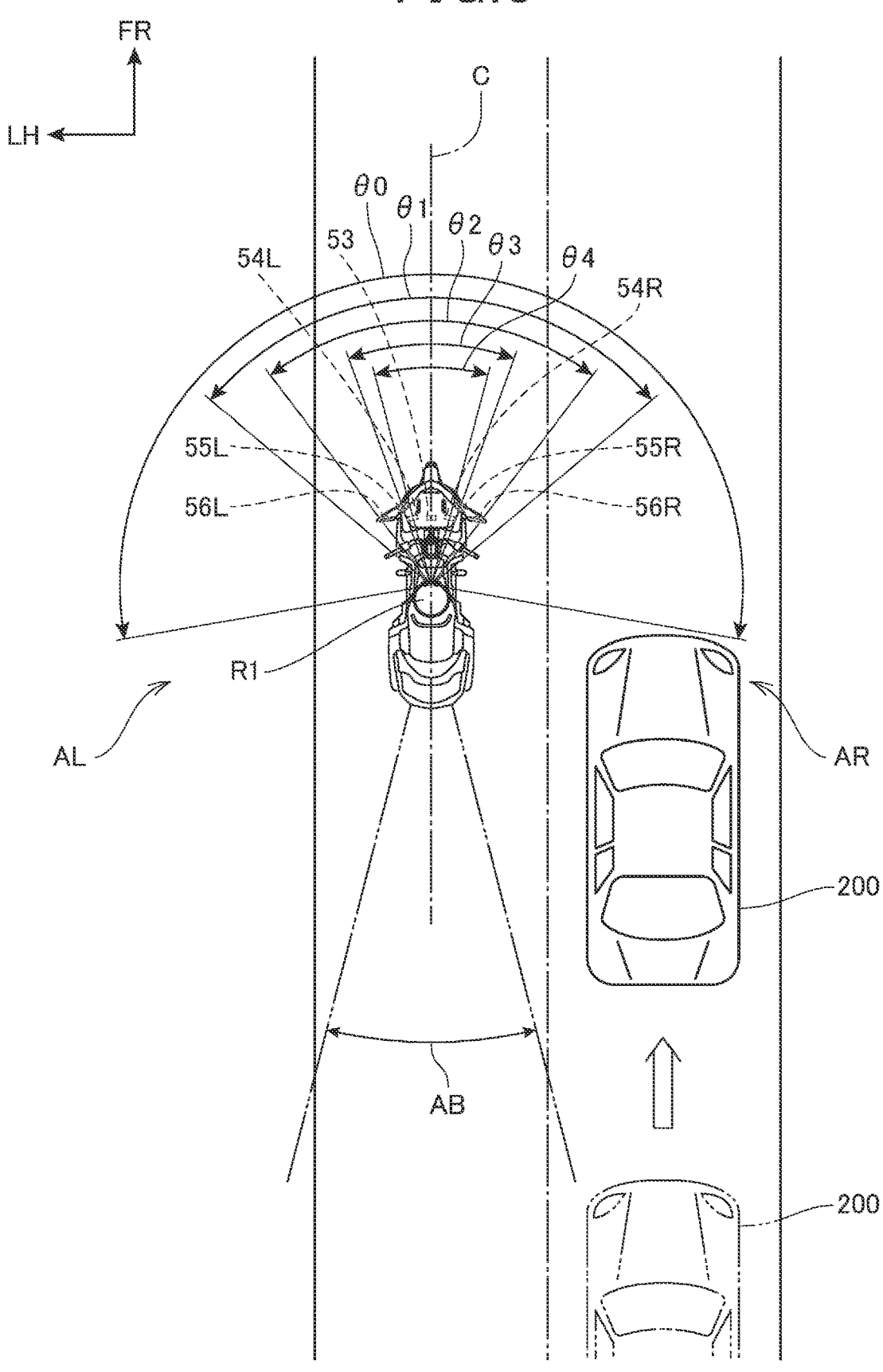
FIG. 3 is an explanatory diagram of a speed of the motorcycle, viewing fields, and blind spots.

FIG. 3 is an explanatory diagram of a speed of the motorcycle, viewing fields θ0 to θ4, and blind spots AL and AR.

In the present embodiment, BSI display devices 50 (see FIG. 2) as information display devices are provided to the display device 30 and the rear-view mirrors 26L and 26R. The BSI display devices 50 display, as one example of vehicle periphery information, information about whether or not another vehicle (object) 200 is present in the blind spot (blind spot region) AL or AR. BSI is an abbreviated expression of blind spot information. Note that the blind spots AL and AR are ranges which the driver seeing the front is incapable of visually recognizing or ranges which the driver is incapable of visually recognizing via the rear-view mirrors 26. In the motorcycle 1, the blind spots AL and AR of the driver correspond to regions in side rear areas of the motorcycle 1 driven by the driver, that is, the subject vehicle 1. Specifically, in FIG. 3, the left blind spot AL corresponds to a region on a left side of the subject vehicle 1, the region being interposed between ranges θ0 to θ4 which a driver R1 seeing the front can see without moving the eyes and a range AB which is visually recognizable via the rear-view mirrors 26. Further, the right blind spot AR corresponds to a region on a right side of the subject vehicle 1, the region being interposed between ranges θ0 to θ4 which the driver R1 can see without moving the eyes and the range AB which is visually recognizable via the rear-view mirrors 26.

As illustrated in FIG. 2, the BSI display devices 50 of the present embodiment include a meter indicator 51 provided to the display device 30 and a pair of left and right mirror indicators 52 provided to the rear-view mirrors 26L and 26R.

In the present embodiment, the meter indicator 51 includes a plurality of indicators (vehicle periphery information display regions) 53, 54L, and 54R. In detail, the meter indicator 51 includes the indicator 53 of a meter central portion, the indicator 53 being provided to the central portion of the display device 30 in the vehicle width direction, and a pair of left and right indicators 54L and 54R of meter end portions, the indicators 54L and 54R being provided to vehicle-width-direction outer end portions of the display device 30. The indicators 53, 54L, 54R are provided to upper portions of the display device 30. That is, the indicators 53, 54L, 54R are provided to upper sides of portions in the display device 30 in the left-right direction. In particular, in the present embodiment, the indicators 53, 54L, 54R are provided contiguously to an upper edge of the display device 30. The indicator 53 of the meter central portion is provided above the monitor 33. The indicators 54L and 54R of the meter end portions are respectively provided to vehicle-width-direction outer sides of the gauges 31 and 32.

In the present embodiment, the mirror indicators 52 include a plurality of indicators (vehicle periphery information display regions) 55L, 55R, 56L, and 56R. In detail, the mirror indicators 52 include a pair of left and right indicators 55L and 55R of mirror support portions, the indicators 55L and 55R being provided to the support stays 42L and 42R of the rear-view mirrors 26L and 26R, and a pair of left and right indicators 56L and 56R of mirrors, the indicators 56L and 56R being provided to the mirror main bodies 41L and 41R of the rear-view mirrors 26L and 26R. The indicators 55L and 55R of the mirror support portions are provided to intermediate portions of the support stays 42L and 42R in a longitudinal direction. The indicators 55L and 55R of the mirror support portions are provided to upper portions of the support stays 42L and 42R. The indicators 56L and 56R of the mirrors are provided to upper portions of the mirror main bodies 41L and 41R. In particular, in the present embodiment, the indicators 56L and 56R of the mirrors are provided in positions contiguous to upper edges of the mirror main bodies 41L and 41R. Further, the indicators 56L and 56R of the mirrors are provided to vehicle-width-direction outer sides.

The indicators 53 to 56 are brought to positions above components, and the indicators 53 to 56 can thereby be arranged in positions in which the driver more easily notices those.

In the BSI display devices 50, the indicators 53 to 56 are provided in symmetrical positions relative to a vehicle-width-direction center line C (see FIG. 3) of the motorcycle 1. Thus, in the motorcycle 1 as one example of a vehicle in which balance in the left-right direction is good and the driver is present on the vehicle-width-direction center line C, the vehicle periphery information can more effectively and easily be notified to the driver.

A basic configuration of each of the indicators 53 to 56 is similar. Each of the indicators 53 to 56 is configured such that a light source (not illustrated) lights up and a BSI image (not illustrated) is thereby displayed.

The indicators 54L to 56L on the left side are configured such that in accordance with placement positions on the left side, BSI images (not illustrated) imitating the subject vehicle 1 and the other vehicle 200 which approaches or enters the left blind spot AL are displayed.

Further, the indicators 54R to 56R on the right side are configured such that in accordance with placement positions on the right side, BSI images (not illustrated) imitating the subject vehicle 1 and the other vehicle 200 which approaches or enters the right blind spot AR are displayed.

The indicator 53 of the meter central portion is configured such that one indicator 53 is capable of displaying BSI images corresponding to left and right. That is, for example, the indicator 53 includes a light source (not illustrated) on the left side and a light source (not illustrated) on the right side and is configured such that the light source on the left side lights up, the BSI images imitating the subject vehicle 1 and the other vehicle 200 which approaches or enters the left blind spot AL of the subject vehicle 1 are thereby capable of being displayed, the light source on the right side lights up, and the BSI images imitating the subject vehicle 1 and the other vehicle 200 which approaches or enters the right blind spot AR of the subject vehicle 1 are thereby capable of being displayed.

The display device 30 abuts the rear-view mirrors 26L and 26R, the meter indicator 51 and the mirror indicators 52 are thereby enabled to easily provide a sense of visual and functional unity, and lighting positions of the indicators 53 to 56 are easily changed as if those were continuous. Thus, notifications by the indicators 53 to 56 are easily noticed by the driver, and designability can be improved.

In particular, in the present embodiment, on one side of both of the left and right sides, in the vehicle width direction, an interval from the indicator 54 of the meter end portion to the indicator 55 of the mirror support portion is shorter than an interval from the indicator 53 of the meter central portion to the indicator 54 of the meter end portion. Further, on one side of both of the left and right sides, in the vehicle width direction, an interval from the indicator 55 of the meter end portion to the indicator 56 of the mirror support portion is shorter than an interval from the indicator 53 of the meter central portion to the indicator 54 of the meter end portion.

In FIG. 3, it has been known that the range which the driver R1 can see without moving the eyes, that is, the viewing fields θ0 to θ4 become narrower as the speed of the subject vehicle 1 increases.

In general, it is considered that when the speed of the subject vehicle 1 is 0 km/h, the driver R1 has the viewing field θ0 in a whole range of 200° in the left-right direction while the vehicle front (the vehicle-width-direction center line C on the front side) is set as a reference.

Further, it is considered that when the speed of the subject vehicle 1 is 40 km/h, the driver R1 has the viewing field θ1 in a whole range of 100° in the left-right direction while the vehicle front is set as the reference.

In addition, it is considered that when the speed of the subject vehicle 1 is 70 km/h, the driver R1 has the viewing field θ2 in a whole range of 75° in the left-right direction while the vehicle front is set as the reference.

Further, it is considered that when the speed of the subject vehicle 1 is 100 km/h, the driver R1 has the viewing field θ3 in a whole range of 40° in the left-right direction while the vehicle front is set as the reference.

In addition, it is considered that when the speed of the subject vehicle 1 is 130 km/h, the driver R1 has the viewing field θ4 in a whole range of 30° in the left-right direction while the vehicle front is set as the reference.

In the present embodiment, the indicators 56L and 56R of the mirrors are provided on inner sides of the viewing field θ2 and outer sides of the viewing field θ3. Further, the indicators 55L and 55R of the mirror support portions are provided on vehicle-width-direction inner sides of the indicators 56L and 56R of the mirrors and in positions corresponding to outer end portions of the viewing field θ3. In addition, the indicators 54L and 54R of the meter end portions are provided on vehicle-width-direction inner sides of the indicators 55L and 55R of the mirror support portions and in positions corresponding to the outer end portions of the viewing field θ4. In addition, the indicator 53 of the meter central portion is provided to the central portion of the display device 30 in the vehicle width direction and is thus provided on vehicle-width-direction inner sides of the indicators 54L and 54R of the meter end portions and on an inner side of the viewing fields θ0 to θ4.

Figure 4:
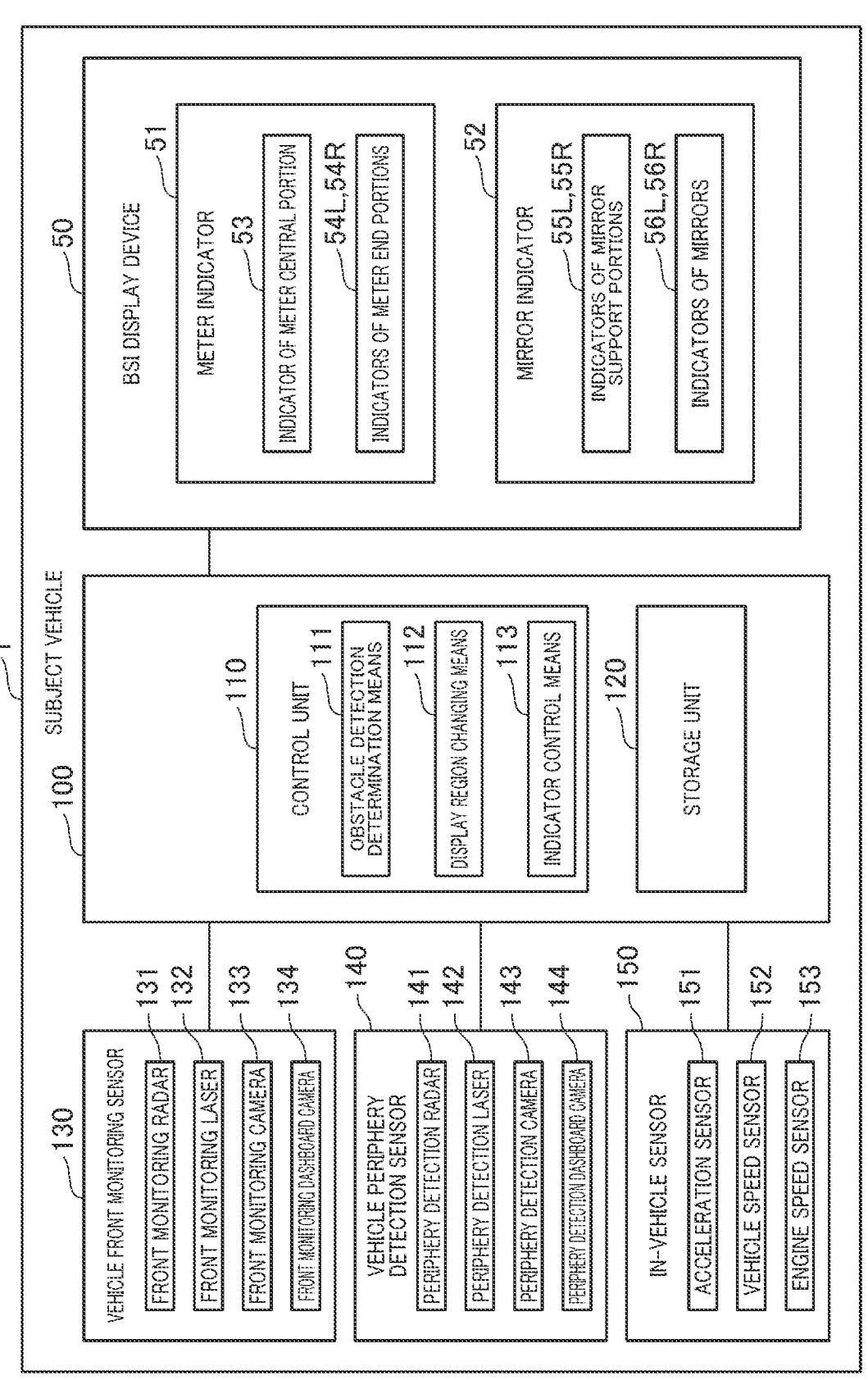
FIG. 4 is a block diagram illustrating an ECU together with peripheral configurations.

FIG. 4 is a block diagram illustrating an ECU 100 together with peripheral configurations.

The subject vehicle 1 includes the ECU 100. ECU is an abbreviated expression of electronic control unit. The ECU 100 is a computer device which includes a control unit 110, a storage unit 120, an interface circuit for communication, and so forth.

The storage unit 120 includes memories such as a ROM and a RAM. ROM is an abbreviated expression of read-only memory. RAM is an abbreviated expression of random access memory. The storage unit 120 stores control programs to be executed by the control unit 110. Further, the storage unit 120 stores data which are processed when the control unit 110 executes a computer program and data of processing results.

The control unit 110 is configured with a CPU, a microcomputer, and so forth and controls each unit of the ECU 100 by executing a program. CPU is an abbreviated expression of central processing unit. Further, the control unit 110 may be an SoC in which the control unit 110 and the storage unit 120 are integrated together. SoC is an abbreviated expression of system-on-a-chip.

With the ECU 100, a vehicle front monitoring sensor 130, a vehicle periphery detection sensor 140, and an in-vehicle sensor 150 are connected. Further, the BSI display devices 50 are connected with the ECU 100.

The vehicle front monitoring sensor 130, the vehicle periphery detection sensor 140, the in-vehicle sensor 150, and the BSI display devices 50 are connected to be capable of transmission and reception, between those and the ECU 100, of signal information such as detection signals and control signals via communication lines.

The vehicle front monitoring sensor 130 monitors the front of the subject vehicle 1, that is, the vehicle front. The vehicle front monitoring sensor 130 includes a front monitoring radar 131, a front monitoring laser 132, a front monitoring camera 133, and a front monitoring dashboard camera 134.

The front monitoring radar 131 emits an electric wave toward the vehicle front, measures a reflected wave from an object in the vehicle front, and thereby detects a distance to the object in the vehicle front and a direction. The front monitoring radar 131 detects a preceding vehicle which travels in the vehicle front or an obstacle in the vehicle front. As the electric wave of the front monitoring radar 131, for example, a millimeter wave is raised.

The front monitoring laser 132 emits laser light toward the vehicle front, measures reflected laser light from an object in the vehicle front, and thereby detects at least a distance to the object in the vehicle front. The front monitoring laser 132 detects at least a distance with respect to a preceding vehicle which travels in the vehicle front or an obstacle in the vehicle front. The front monitoring laser 132 of the present embodiment is configured with LiDAR. LiDAR is an abbreviated expression of laser imaging detection and ranging or light detection and ranging. As the laser light of the front monitoring laser 132, for example, infrared rays are raised. Note that the front monitoring laser 132 may be scanning LiDAR and may detect the distance to the object in the vehicle front and a direction.

The front monitoring camera 133 captures an image of the vehicle front. The front monitoring camera 133 is configured with a solid state image-capturing element such as a CCD or a CMOS. CCD is an abbreviated expression of charge coupled device. CMOS is an abbreviated expression of complementary metal oxide semiconductor.

The front monitoring dashboard camera 134 records monitoring information by the front monitoring radar 131, the front monitoring laser 132, and the front monitoring camera 133. Note that it is sufficient that the front monitoring dashboard camera 134 is configured to at least record image-capturing information by the front monitoring camera 133. The front monitoring dashboard camera 134 may include a dedicated camera separately from the front monitoring camera 133. Further, a configuration may be made such that the front monitoring dashboard camera 134 performs recording based on an acceleration only in a case where a large acceleration is exerted on the subject vehicle 1.

The vehicle periphery detection sensor 140 detects a peripheral environment of the subject vehicle 1. The vehicle periphery detection sensor 140 detects, as the periphery environment of the subject vehicle 1, a vehicle periphery such as a lateral side of the subject vehicle 1 and the rear of the subject vehicle 1. The vehicle periphery detection sensor 140 may detect, as the vehicle periphery, a range overlapping the front of the subject vehicle 1. The vehicle periphery detection sensor 140 includes a periphery detection radar 141, a periphery detection laser 142, a periphery detection camera 143, and a periphery detection dashboard camera 144.

The periphery detection radar 141 emits an electric wave toward the vehicle periphery, measures a reflected wave from an object in the vehicle periphery, and thereby detects a distance to the object in the vehicle periphery and a direction. The periphery detection radar 141 detects, as the object in the vehicle periphery, a parallel traveling vehicle which travels in the vehicle periphery or a following vehicle which travels in vehicle rear. Further, the periphery detection radar 141 detects, as the object in the vehicle periphery, an obstacle in the vehicle periphery. The periphery detection radar 141 uses a millimeter wave, for example. A plurality of periphery detection radars 141 may be provided on the left and right of the subject vehicle 1, for example.

The periphery detection laser 142 emits laser light toward the vehicle periphery, measures reflected laser light from an object in the vehicle periphery, and thereby detects at least a distance to the object in the vehicle periphery. The periphery detection laser 142 detects at least a distance to a parallel traveling vehicle or a following vehicle in the vehicle periphery or an obstacle in the vehicle periphery, as the object in the vehicle periphery. The periphery detection laser 142 of the present embodiment is configured with LiDAR. Note that the periphery detection laser 142 may be scanning LiDAR and may detect the distance to the object in the vehicle periphery and a direction. A plurality of periphery detection lasers 142 may be provided on the left and right of the subject vehicle 1, for example.

The periphery detection camera 143 captures an image of the vehicle periphery. The periphery detection camera 143 is configured with a solid state image-capturing element such as a CCD or a CMOS. A plurality of periphery detection cameras 143 may be provided on the left and right of the subject vehicle 1, for example.

The periphery detection dashboard camera 144 records detection information by the periphery detection radar 141, the periphery detection laser 142, and the periphery detection camera 143. Note that it is sufficient that the periphery detection dashboard camera 144 is configured to at least record image-capturing information by the periphery detection camera 143. The periphery detection dashboard camera 144 may include a dedicated camera separately from the periphery detection camera 143. Further, a configuration may be made such that the periphery detection dashboard camera 144 performs recording based on an acceleration only in a case where a large acceleration is exerted on the subject vehicle 1.

The in-vehicle sensor 150 detects a state of the subject vehicle 1 such as the speed of the subject vehicle 1 or the engine speed. The in-vehicle sensor 150 includes an acceleration sensor 151, a vehicle speed sensor 152, and an engine speed sensor 153.

The acceleration sensor 151 detects an acceleration of the subject vehicle 1 as the state of the subject vehicle 1. The acceleration sensor 151 of the present embodiment detects an acceleration of the subject vehicle 1 in the front-rear direction. Further, the acceleration sensor 151 detects an acceleration of the subject vehicle 1 in the left-right direction. In addition, the acceleration sensor 151 detects a rotation angular speed of the subject vehicle 1 in a yaw direction.

The vehicle speed sensor (speed sensor) 152 detects the speed of the subject vehicle 1, that is, the vehicle speed as the state of the subject vehicle 1.

The engine speed sensor 153 detects the engine speed of the engine 11 as the state of the subject vehicle 1.

The BSI display devices 50 include the meter indicator 51 and the mirror indicators 52.

The meter indicator 51 includes the indicator 53 of the meter central portion and the pair of left and right indicators 54L and 54R of the meter end portions.

The mirror indicators 52 include the pair of left and right indicators 55L and 55R of the mirror support portions and the pair of left and right indicators 56L and 56R of the mirrors.

The BSI display devices 50 are controlled by the control unit 110.

The control unit 110 executes the control programs stored in the storage unit 120, and the ECU 100 thereby realizes various kinds of functional configurations. The ECU 100 of the present embodiment has, as functional configurations, obstacle detection determination means 111, display region changing means 112, and indicator control means 113.

Based on information input from the vehicle front monitoring sensor 130 and the vehicle periphery detection sensor 140, the obstacle detection determination means 111 determines whether or not an object is detected in the vehicle front or the vehicle periphery.

Based on the monitoring information by the front monitoring radar 131, the front monitoring laser 132, and the front monitoring camera 133 of the vehicle front monitoring sensor 130, the obstacle detection determination means 111 of the present embodiment determines whether or not the other vehicle 200 as an obstacle is detected in the vehicle front.

Further, based on the detection information by the periphery detection radar 141, the periphery detection laser 142, and the periphery detection camera 143 of the vehicle periphery detection sensor 140, the obstacle detection determination means 111 determines whether or not the other vehicle 200 as the obstacle is detected in the vehicle periphery.

In particular, in a case where it is determined whether or not the other vehicle 200 is detected in the vehicle periphery, the obstacle detection determination means 111 of the present embodiment determines whether or not the other vehicle 200 is detected which approaches or enters the blind spot AL or AR of the subject vehicle 1. For example, in a case where it is detected that the direction and distance from the subject vehicle 1 to the other vehicle 200 are positioned in a certain region in left rear of the subject vehicle 1, the certain region being set in advance in consideration of a margin, the obstacle detection determination means 111 is capable of determining that the other vehicle 200 is detected in the left blind spot AL. Further, in a case where it is detected that the direction and distance from the subject vehicle 1 to the other vehicle 200 are positioned in a certain region in right rear of the subject vehicle 1, the certain region being set in advance in consideration of a margin, the obstacle detection determination means 111 is capable of determining that the other vehicle 200 is detected in the right blind spot AR.

The display region changing means 112 changes the indicators 53 to 56 which display the vehicle periphery information in accordance with the vehicle speed. In a case of low speed travel, the display region changing means 112 changes control targets to the indicators 54 to 56 on the vehicle-width-direction outer side among the plurality of indicators 53 to 56. Further, in a case of high speed travel, the display region changing means 112 changes the control targets to the indicators 53 to 55 on the vehicle-width-direction inner side among the plurality of indicators 53 to 56.

In the present embodiment, in the display region changing means 112, a plurality of threshold values of speed are set in advance based on the viewing fields θ0 to θ4, and at each time when the vehicle speed exceeds a greater threshold value, the indicators 53 to 56 as the control targets are changed to the indicators 53 to 56 further on the vehicle-width-direction inner side.

In detail, the display region changing means 112 acquires the vehicle speed from the vehicle speed sensor 152. Then, in a case where the vehicle speed is smaller than 40 km/h (first threshold value), the display region changing means 112 changes the control targets to the indicators 56L and 56R of the mirrors. Further, in a case where the vehicle speed is 40 km/h (first threshold value speed) or greater and smaller than 70 km/h (second threshold value), the display region changing means 112 changes the control targets to the indicators 55L and 55R of the mirror stays. In addition, in a case where the vehicle speed is 70 km/h (second threshold value speed) or greater and smaller than 100 km/h (third threshold value), the display region changing means 112 changes the control targets to the indicators 54L and 54R of the meter end portions. Further, in a case where the vehicle speed is 100 km/h (fourth threshold value) or greater, the display region changing means 112 changes the control target to the indicator 53 of the meter central portion.

The indicator control means 113 controls the BSI display devices 50 based on a determination result by the obstacle detection determination means 111. In the present embodiment, in a case where the other vehicle 200 is detected in the blind spot AL or AR, the indicator control means 113 controls, as the control targets, the indicators 53 to 56 which are set (changed) by the display region changing means 112.

In a case where the other vehicle 200 is detected in the left blind spot AL, the indicator control means 113 lights the indicators 53, 54L, 55L, and 56L which correspond to the left side and which are the indicators 53 to 56L set by the display region changing means 112. Further, in a case where the other vehicle 200 is detected in the right blind spot AR, the indicator control means 113 lights the indicators 53, 54R, 55R, and 56R which correspond to the right side and which are the indicators 53 to 56R set by the display region changing means 112. Note that in a case where the other vehicle 200 is not detected in the blind spot AL or AR, the indicator control means 113 turns off the indicators 53 to 56.

Figure 5:
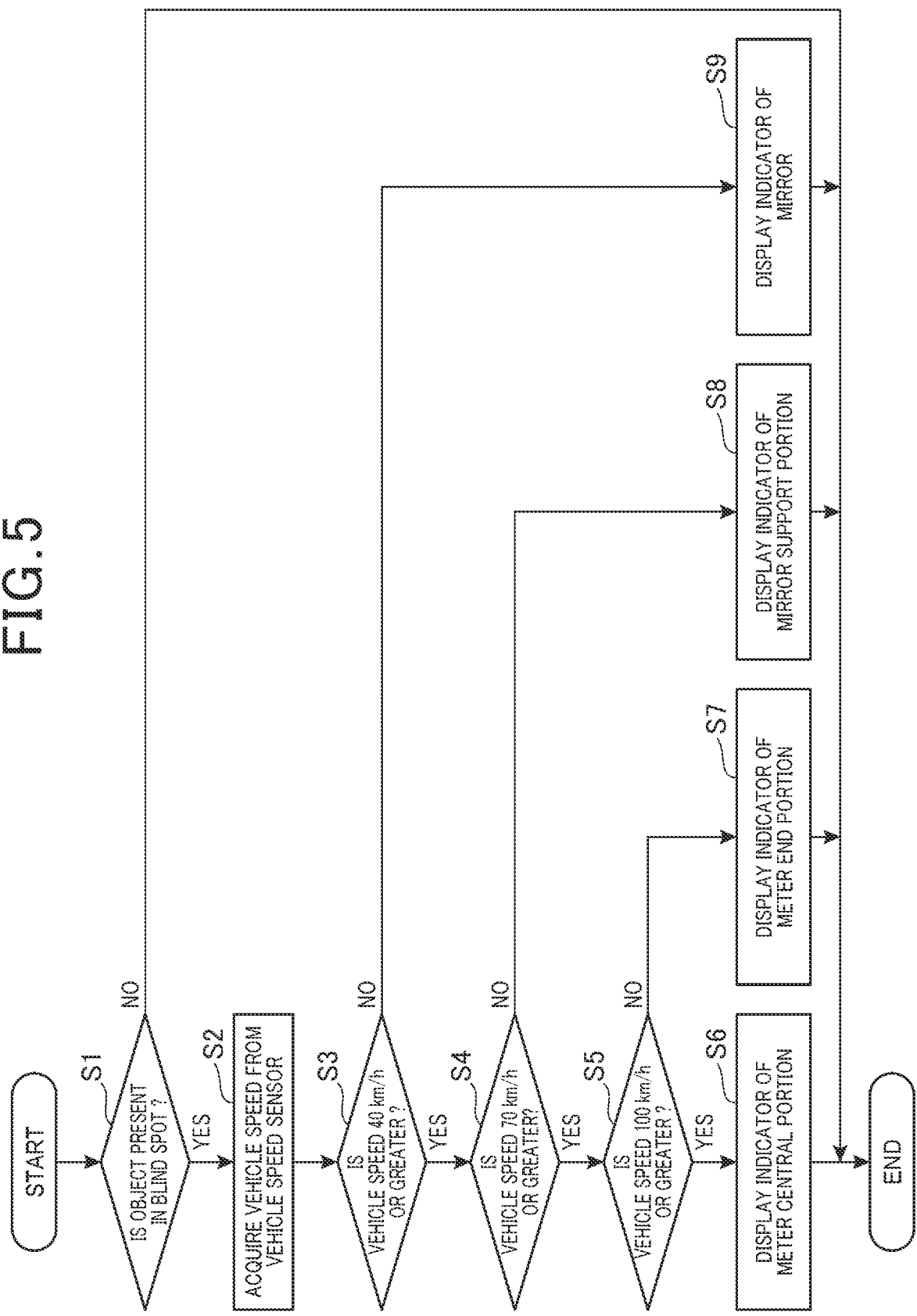
FIG. 5 is a flowchart illustrating an action of an indicator display process of the ECU.

FIG. 5 is a flowchart illustrating an action of an indicator display process of the ECU 100.

In the present embodiment, the indicator display process is started when an operation for driving assistance is input by the operation unit 35 and is periodically repeated at adequate timings, for example.

The ECU 100 determines whether or not the object is present in the blind spot AL or AR, that is, whether or not the other vehicle 200 is detected in the blind spot AL or AR (step S1).

In a case where the object is not present in the blind spot AL or AR (NO in step S1), the ECU 100 finishes the indicator display process in a state where the indicators 53 to 56 are turned off.

In a case where the object is present in the blind spot AL or AR (YES in step S1), the ECU 100 acquires the vehicle speed from the vehicle speed sensor 152 (step S2).

When the vehicle speed is acquired from the vehicle speed sensor 152, the ECU 100 determines whether or not the vehicle speed is 40 km/h or greater (step S3).

In a case where the vehicle speed is not 40 km/h or greater (NO in step S3), the ECU 100 lights the indicator 56 of the mirror and performs display (step S9).

In a case where the vehicle speed is 40 km/h or greater (YES in step S3), the ECU 100 determines whether or not the vehicle speed is 70 km/h or greater (step S4).

In a case where the vehicle speed is not 70 km/h or greater (NO in step S4), the ECU 100 lights the indicator 55 of the mirror support portion and performs display (step S8).

In a case where the vehicle speed is 70 km/h or greater (YES in step S4), the ECU 100 determines whether or not the vehicle speed is 100 km/h or greater (step S5).

In a case where the vehicle speed is not 100 km/h or greater (NO in step S5), the ECU 100 lights the indicator 54 of the meter end portion and performs display (step S7).

In a case where the vehicle speed is 100 km/h or greater (YES in step S5), the ECU 100 lights the indicator 53 of the meter central portion and performs display (step S6).

When the indicators 53 to 56 are displayed, the ECU 100 finishes the indicator display process.

In the present embodiment, in a case where the subject vehicle (motorcycle) 1 is traveling and where the other vehicle 200 which approaches or enters the blind spot AL or AR is detected by the vehicle periphery detection sensor 140 or the like, the BSI display devices 50 are lit, and the BSI images are displayed. Thus, the driver R1 easily notices the other vehicle 200 which approaches or enters the blind spot AL or AR.

In this case, in the present embodiment, in accordance with the vehicle speed, the control targets of the indicators 53 to 56 of the BSI display devices 50, that is, the lighting positions are changed. Thus, compared to a case where the lighting positions of the BSI display devices 50 are not changed, the notification about the BSI is less likely to be excessive information relative to actual display information of the display device 30 and the rear-view mirrors 26. Further, compared to a case where the BSI image is continued to be displayed on the rear-view mirror 26 as a vehicle-width-direction outer end, the lighting positions are switched in accordance with the viewing fields θ0 to θ4 which are narrowed based on the vehicle speed, and it is thereby possible to appropriately perform the notification to the driver without moving the indicators 53 to 56 themselves.

As described above, in the present embodiment to which the present invention is applied, in the subject vehicle 1 which includes the vehicle periphery detection sensor 140 which detects the periphery environment of the subject vehicle 1, the vehicle speed sensor 152 which detects the vehicle speed, and the plurality of indicators 53, 54, 55, and 56 which display the vehicle periphery information detected by the vehicle periphery detection sensor 140, the indicators 53, 54, 55, and 56 as display control targets are changed in accordance with the vehicle speed detected by the vehicle speed sensor 152. Consequently, because the indicators 53, 54, 55, and 56 are changed in accordance with the sizes of the viewing fields θ0 to θ4 which are changed in response to the magnitude of the vehicle speed, an appropriate notification conforming to a state of the driver R1 can be performed. Thus, troublesomeness can be reduced, and the vehicle peripheral information can appropriately be notified.

In the present embodiment, in the case of low speed travel, the vehicle periphery information is displayed by the indicators 53, 54, 55, and 56 on the vehicle-width-direction outer sides among the plurality of indicators 53, 54, 55, and 56, and in the case of high speed travel, the vehicle periphery information is displayed by the indicators 53, 54, 55, and 56 on the vehicle-width-direction inner sides among the plurality of indicators 53, 54, 55, and 56. Consequently, the vehicle periphery information is displayed on the indicators 53, 54, 55, and 56, which are closer to the vehicle-width-direction center line C, in accordance with the viewing fields θ0 to θ4 of the driver R1 which are more narrowed toward the center as the vehicle speed becomes greater, and the vehicle periphery information can thereby appropriately be notified to the driver R1.

Further, in the present embodiment, the subject vehicle 1 further includes the display device 30 which at least displays the information about the state of the subject vehicle 1 and the rear-view mirrors 26 which include connection portions 42 connecting the subject vehicle 1 with mirror main bodies 41 reflecting the rear area, and the indicators 53, 54, 55, and 56 are provided to either one of the display device 30 and the rear-view mirrors 26. Consequently, the indicators 53, 54, 55, and 56 are provided to the display device 30 and the rear-view mirrors 26, and the vehicle periphery information can thereby efficiently be notified to the driver R1 by using apparatuses provided to the subject vehicle 1.

Further, in the present embodiment, a plurality of indicators 53, 54, 55, and 56 are provided to at least either one of the display device 30 and the rear-view mirrors 26. Consequently, the plurality of indicators 53, 54, 55, and 56 are provided in one component, and display sections (control targets) of the indicators 53, 54, 55, and 56, the display sections corresponding to changes in the vehicle speed, can thereby continuously be changed.

Further, in the present embodiment, a plurality of rear-view mirrors 26L and 26R are provided to the subject vehicle 1, and the display device 30 and the plurality of rear-view mirrors 26L and 26R abut each other. Consequently, because the display device 30 abuts the rear-view mirrors 26L and 26R and changes in the indicators 53, 54, 55, and 56 can thereby be performed as if those were continuous, the driver R1 is thus enabled to easily notice the indicators 53, 54, 55, and 56, and designability is improved.

Further, in the present embodiment, the plurality of indicators 53, 54, 55, and 56 are provided to at least either one of the upper portion of the display device 30 and upper portions of the rear-view mirrors 26L and 26R. Consequently, the indicators 53, 54, 55, and 56 are brought to the positions above the components, and the indicators 53, 54, 55, and 56 can thereby be arranged in the positions in which the driver more easily notices those.

Further, in the present embodiment, the indicators 53, 54, 55, and 56 are provided in symmetrical positions relative to the vehicle-width-direction center line C of the subject vehicle 1. Consequently, in the vehicle in which balance in the left-right direction is good and the driver is present on the vehicle-width-direction center line C, the vehicle periphery information can more effectively and easily be notified to the driver R1. Thus, the BSI display devices 50 of the present embodiment are suitable for the motorcycle 1 in which positions of the display device 30 and the rear-view mirrors 26L and 26R are closer to each other than those of a four-wheeled vehicle.

Other Embodiments

The above-described embodiment merely represents one form of the present invention, and arbitrary modification and application are possible without departing from the scope of the gist of the present invention.

Figure 6:
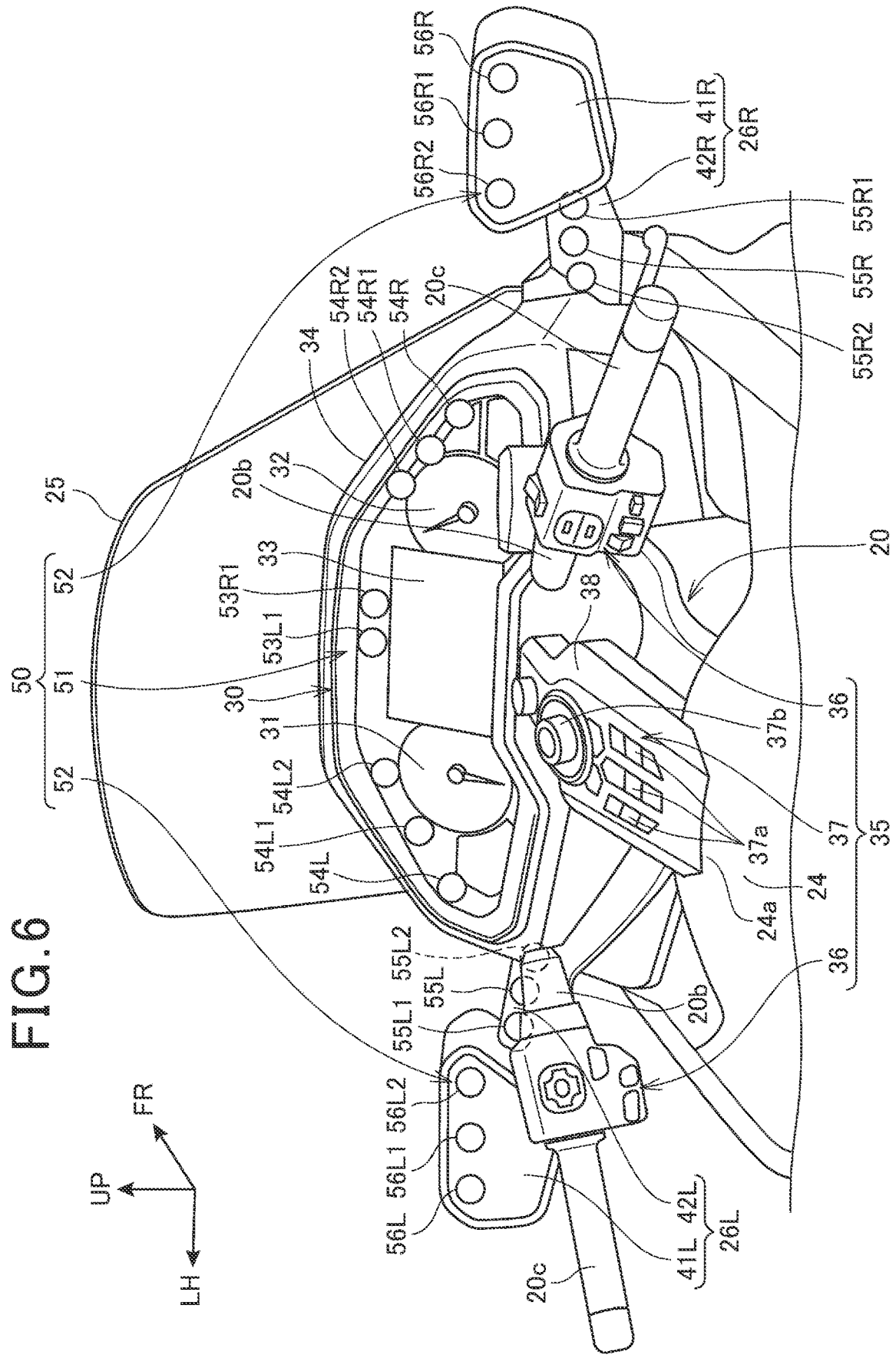
FIG. 6 is a perspective view illustrating, as an example, arrangement of indicators in another embodiment.

FIG. 6 is a perspective view illustrating, as an example, arrangement of the indicators 53, 54, 55, and 56 in another embodiment.

In the above embodiment, a description is made about a configuration in which in the indicator 53 of the meter central portion, one indicator 53 displays approach or entrance of the other vehicle 200 to the left and right blind spots AL and AR. However, instead of this, for example, as illustrated in FIG. 6, a pair of left and right indicators 53L1 and 53R1 of the meter central portion are provided to the central portion of the display device 30 in the vehicle width direction, and the left and right separate indicators 53L1 and 53R1 may respectively display approach or entrance of the other vehicle 200 to the left and right blind spots AL and AR.

In the above embodiment, a description is made about a configuration in which the BSI display devices 50 have the meter indicator 51 and the mirror indicators 52. However, instead of this, the BSI display device 50 may be configured with only either one of the meter indicator 51 and the mirror indicators 52, and for example, a configuration is possible in which the mirror indicators 52 are omitted and only the meter indicator 51 is provided.

In the above embodiment, a description is made about a configuration in which the meter indicator 51 includes the indicator 53 of the meter central portion and the indicators 54L and 54R of the meter end portions and the mirror indicators 52 include the indicators 55L and 55R of the mirror support portions and the indicators 56L and 56R of the mirrors. However, the numbers of indicators are not limited to those. For example, as illustrated in FIG. 6, a configuration is possible which is provided with a plurality of indicators 53L1 and 53R1 of the meter central portion, a plurality of indicators 54L, 54L1, 54L2, 54R, 54R1, and 54R2 of the meter end portions, a plurality of indicators 55L, 55L1, 55L2, 55R, 55R1, and 55R2 of the mirror support portions, and a plurality of indicators 56L, 56L1, 56L2, 56R, 56R1, and 56R2 of the mirrors. In a case where a plurality of indicators are provided, it is desirable that the indicators be provided in positions shifted in the vehicle width direction so as to correspond to the viewing fields which are changed in accordance with the vehicle speed. Further, a plurality of threshold values are set in accordance with the viewing fields, and at each time when the speed exceeds a greater threshold value, the indicators as the control targets may be changed to the indicators further on the vehicle-width-direction inner sides.

In the above embodiment, a description is made about a configuration in which the indicator control means 113 lights or turns off the indicators 53 to 56 based on whether or not the other vehicle 200 is detected in the blind spot AL or AR; however, the indicator control means 113 may perform control for switching lighting control, flashing control, and so forth in accordance with the position of the other vehicle 200 in the blind spot AL or AR, for example, a distance.

In the above embodiment, a description is made about a configuration in which in the indicators 53 to 56, the BSI images are displayed based on whether or not the light sources light up, but the indicators may be used which are formed with displays displaying the BSI images.

In the above embodiment, a description is made about configurations of the indicators 53 to 56, which display the BSI images, as the vehicle periphery information display regions, but displays or the like may be used which are capable of displaying the speed and so forth.

In the above embodiment, a description is made by raising, as an example, the motorcycle 1 as the vehicle, but the present invention is not limited to this, and the present invention may be applied to a display device and mirror bodies of a four-wheeled vehicle.

[Configurations Supported by Above Embodiments]

The above embodiments support the following configurations.

(Configuration 1) A vehicle including: a vehicle periphery detection sensor which detects a periphery environment of the vehicle; a speed sensor which detects a speed of the vehicle; and a plurality of vehicle periphery information display regions which display vehicle periphery information, the vehicle periphery information being detected by the vehicle periphery detection sensor, in which the vehicle periphery information display regions to be displayed are changed in accordance with the speed detected by the speed sensor.

In this configuration, because the vehicle periphery information display regions are changed in accordance with the size of the viewing field which is changed in response to the magnitude of the vehicle speed, an appropriate notification conforming to a state of the driver can be performed. Thus, troublesomeness can be reduced, and the vehicle peripheral information can appropriately be notified.

(Configuration 2) The vehicle described in the configuration 1, in which in a case of low speed travel, the vehicle periphery information is displayed by the vehicle periphery information display region on a vehicle-width-direction outer side among the plurality of vehicle periphery information display regions, and in a case of high speed travel, the vehicle periphery information is displayed by the vehicle periphery information display region on a vehicle-width-direction inner side among the plurality of vehicle periphery information display regions.

In this configuration, the vehicle periphery information is displayed by the vehicle periphery information display regions, which are closer to the center in the vehicle width direction, in accordance with the viewing field of the driver which is more narrowed toward the center as the vehicle speed becomes greater, and the vehicle periphery information can thereby appropriately be notified to the driver.

(Configuration 3) The vehicle described in the configuration 1 or 2, further including: a display device which at least displays information about a state of the vehicle; and a mirror body which includes a connection portion connecting the vehicle with a mirror, the mirror reflecting a rear area, in which the vehicle periphery information display region is provided to at least either one of the display device and the mirror body.

In this configuration, the vehicle periphery information display regions are provided to the display device and the mirror body, and the vehicle periphery information can thereby efficiently be notified to the driver by using apparatuses provided to the vehicle.

(Configuration 4) The vehicle described in the configuration 3, in which the plurality of vehicle periphery information display regions are provided to at least either one of the display device and the mirror body.

In this configuration, the plurality of vehicle periphery information display regions are provided in one component, and display sections of the vehicle periphery information display regions, the display sections corresponding to changes in the vehicle speed, can thereby continuously be changed.

(Configuration 5) The vehicle described in the configuration 3 or 4, in which a plurality of the mirror bodies are provided to the vehicle, and the display device and the plurality of the mirror bodies abut each other.

In this configuration, because the display device abuts the mirror bodies and changes in the vehicle periphery information display regions can thereby be performed as if those were continuous, the driver is thus enabled to easily notice the vehicle periphery information display regions, and designability is improved.

(Configuration 6) The vehicle described in any one of the configurations 3 to 5, in which the vehicle periphery information display region is provided to at least either one of an upper portion of the display device and an upper portion of the mirror body.

In this configuration, the vehicle periphery information display regions are brought to positions above components, and the vehicle periphery information display regions can thereby be arranged in positions in which the driver more easily notices those.

(Configuration 7) The vehicle described in any one of the configurations 1 to 6, in which the vehicle periphery information display regions are provided in symmetrical positions relative to a center of the vehicle in a width direction.

In this configuration, in the vehicle in which balance in the left-right direction is good and the driver is present at the center in the width direction of the vehicle, the vehicle periphery information can more effectively and easily be notified to the driver.

REFERENCE SIGNS LIST

1 motorcycle (straddle type vehicle, subject vehicle, vehicle)
26, 26L, 26R rear-view mirror (mirror body)
30 display device
41, 41L, 41R mirror main body (mirror)
42, 42L, 42R support stay (connection portion)
53, 53L, 53L1, 53R, 53R1 indicator of meter central portion (vehicle periphery information display region)
54, 54L, 54L1, 54L2, 54R, 54R1, 54R2 indicator of meter end portion (vehicle periphery information display region)
55, 55L, 55L1, 55L2, 55R, 55R1, 55R2 indicator of mirror support portion (vehicle periphery information display region)
56, 56L, 56L1, 56L2, 56R, 56R1, 56R2 indicator of mirror (vehicle periphery information display region)
140 vehicle periphery detection sensor
152 vehicle speed sensor (speed sensor)

The invention claimed is:

1. A vehicle comprising:
a vehicle periphery detection sensor which detects a periphery environment of the vehicle;
a speed sensor which detects a speed of the vehicle; and
a plurality of vehicle periphery information display regions which display vehicle periphery information, the vehicle periphery information being detected by the vehicle periphery detection sensor, wherein
the vehicle periphery information display regions are provided to at least two or more components provided to the vehicle,
the vehicle periphery information is displayed by different vehicle periphery information display regions of the vehicle periphery information display regions in accordance with the speed detected by the speed sensor,
in a case of low speed travel, the vehicle periphery information is displayed by the vehicle periphery information display region on a vehicle-width-direction outer side among the plurality of vehicle periphery information display regions, and in a case of high speed travel, the vehicle periphery information is displayed by the vehicle periphery information display region on a vehicle-width-direction inner side among the plurality of vehicle periphery information display regions, and
the vehicle periphery information which is displayed in the vehicle periphery information display regions is the same and is information about another vehicle which approaches or enters a blind spot of a driver of the vehicle.

2. The vehicle according to claim 1, wherein the blind spot is a range which changes in accordance with the speed of the vehicle.

3. The vehicle according to claim 1, wherein the blind spot is a range which does not change in accordance with the speed of the vehicle.

4. The vehicle according to claim 1, wherein the vehicle changes display positions of the vehicle periphery information display regions such that display is performed on an inner side of a viewing field of the driver, the viewing field corresponding to a change in the speed.

5. The vehicle according to claim 1, wherein the vehicle periphery information display regions are provided in symmetrical positions relative to a center of the vehicle in a width direction.

6. The vehicle according to claim 1, further comprising:
a display device which at least displays information about a state of the vehicle;
a mirror which reflects a rear area; and
a connection portion which connects the vehicle with the mirror, wherein
the vehicle periphery information display region is provided to at least any two or more of the display device, the connection portion, and the mirror.

7. The vehicle according to claim 6, wherein the plurality of vehicle periphery information display regions are provided to at least any two or more of the display device, the connection portion, and the mirror.

8. The vehicle according to claim 6, wherein a plurality of the connection portions and a plurality of the mirrors are provided to the vehicle, and the display device and the plurality of the connection portions abut each other.

9. The vehicle according to claim 6, wherein the vehicle periphery information display region is provided to at least any two or more of an upper portion of the display device, an upper portion of the connection portion, and an upper portion of the mirror.

10. A vehicle comprising:
a vehicle periphery detection sensor which detects a periphery environment of the vehicle;
a speed sensor which detects a speed of the vehicle; and
a plurality of vehicle periphery information display regions which display vehicle periphery information, the vehicle periphery information being detected by the vehicle periphery detection sensor, wherein
the vehicle periphery information display regions are provided to at least two or more components provided to the vehicle,
the vehicle periphery information is displayed by different vehicle periphery information display regions of the vehicle periphery information display regions in accordance with the speed detected by the speed sensor,
in a case of low speed travel, the vehicle periphery information is displayed by the vehicle periphery information display region on a vehicle-width-direction outer side among the plurality of vehicle periphery information display regions, and in a case of high speed travel, the vehicle periphery information is displayed by the vehicle periphery information display region on a vehicle-width-direction inner side among the plurality of vehicle periphery information display regions, and
the vehicle changes display positions of the vehicle periphery information display regions such that display is performed on an inner side of a viewing field of a driver, the viewing field corresponding to a change in the speed.

* * * * *